(12) United States Patent
Soderstrom et al.

(10) Patent No.: US 6,729,693 B2
(45) Date of Patent: May 4, 2004

(54) SEAT BELT APPARATUS

(75) Inventors: Pontus Soderstrom, Rochester, MI (US); David Funnell, Windsor (CA)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 09/792,020

(22) Filed: Feb. 21, 2001

(65) Prior Publication Data

US 2003/0034686 A1 Feb. 20, 2003

(51) Int. Cl.$^7$ .................. A47C 3/100; A47D 15/00
(52) U.S. Cl. .................. 297/484; 297/475
(58) Field of Search .................. 297/484, 474, 297/475, 250.1, 467; 280/801.1, 807, 808, 806

(56) References Cited

U.S. PATENT DOCUMENTS

| | | | |
|---|---|---|---|
| 2,861,627 A | | 11/1958 | Smith |
| 3,178,225 A | | 4/1965 | Bayer |
| 3,301,592 A | | 1/1967 | McFarlane et al. |
| 3,549,203 A | | 12/1970 | Rawson |
| 3,620,569 A | | 11/1971 | Mathis |
| 4,090,735 A | | 5/1978 | Czernakowski |
| 4,529,249 A | * | 7/1985 | Ino .................. 297/474 |
| 5,653,504 A | * | 8/1997 | Henson .................. 297/238 |
| 5,676,398 A | * | 10/1997 | Nurtsch .................. 280/806 |
| 5,899,534 A | * | 5/1999 | Gray .................. 297/484 |
| 6,076,894 A | * | 6/2000 | Busch .................. 297/484 |
| 6,139,111 A | * | 10/2000 | Pywell et al. .................. 297/484 |
| 6,305,713 B1 | * | 10/2001 | Pywell et al. .................. 280/801.1 |
| 6,309,024 B1 | * | 10/2001 | Busch .................. 297/484 |
| 6,375,270 B1 | * | 4/2002 | Sullivan et al. .................. 297/484 |

FOREIGN PATENT DOCUMENTS

EP 295838 A1 * 12/1988 .......... B60R/22/10

* cited by examiner

*Primary Examiner*—Peter M. Cuomo
*Assistant Examiner*—Stephen D'Adamo
(74) *Attorney, Agent, or Firm*—James D. Erickson; Sally J. Brown

(57) ABSTRACT

The present invention provides a seat belt apparatus having a webbing which traverses an occupant's body. The webbing includes two lap belts which are secured at their ends to a lap belt retractor. The lap retractor is secured below the seat and in a forward position relative to the seat. The lap belt retractor is configured to simultaneously retract the lap belts to thereby retain the position of the buckle assembly over the mid abdomen section of an occupant. The opposing ends of the lap belts are secured in a fixed manner to a lap belt anchor. The lap belt anchor is secured below the seat and in a rearward position relative to the seat. The lap belt anchor may further incorporate a pretensioner which pulls the lap belts rearward and downward. The lap belts slidably engage a buckle assembly along a mid section of the lap belts. The webbing further includes shoulder belts which are secured at their ends to shoulder belt retractors. The opposing ends of the shoulder belts are secured in a fixed manner to the buckle assembly. The lap belt retractor disposed forward of the lap belt anchor pulls the buckle assembly forward and downward. The pretensioner creates a downward force pulling the buckle assembly rearward to better contact the iliac crests of the occupant's pelvis.

21 Claims, 4 Drawing Sheets

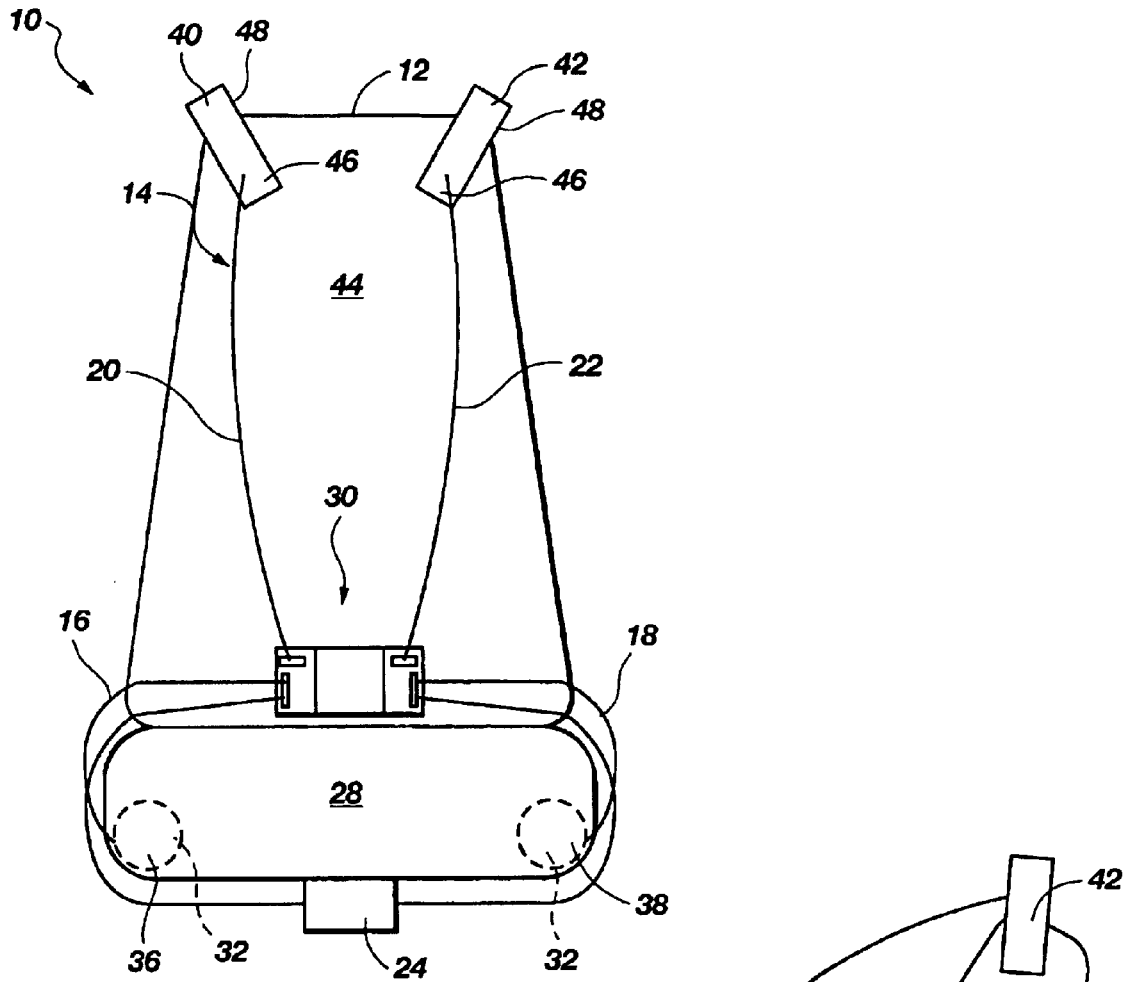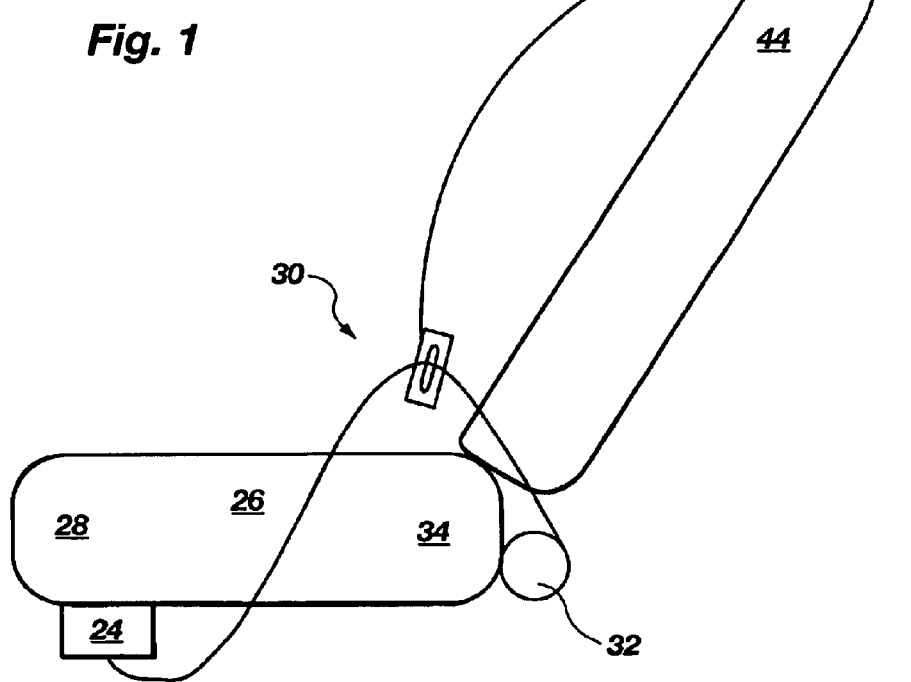

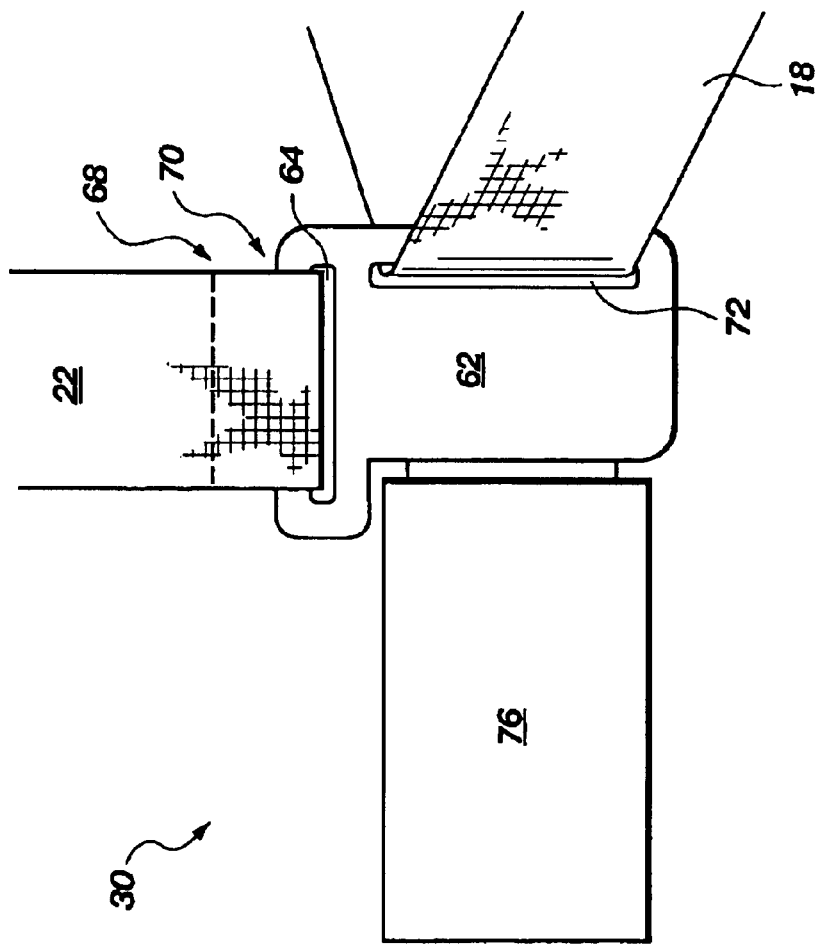
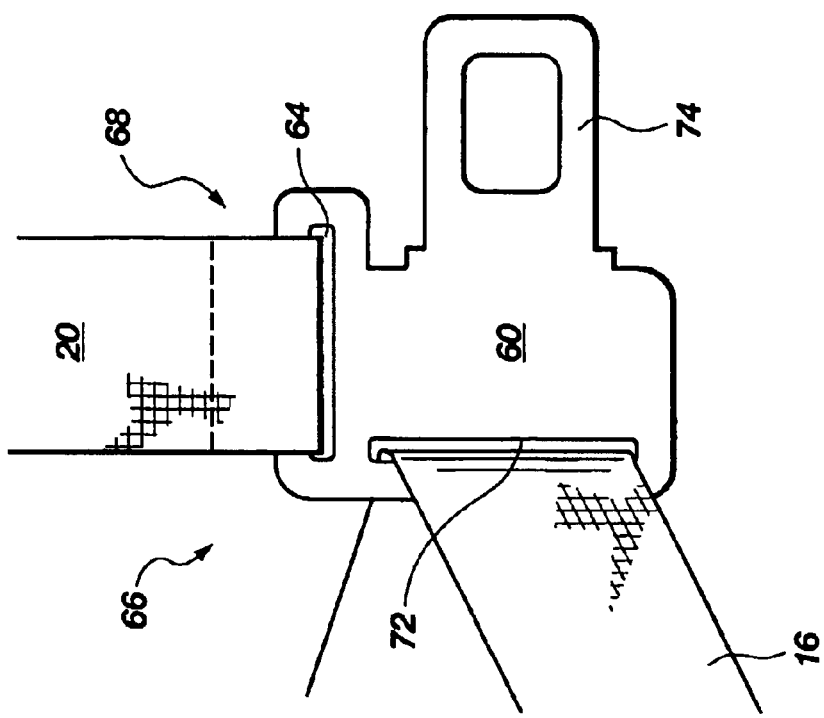
Fig. 3

SEAT BELT APPARATUS

BACKGROUND OF THE INVENTION

1. Field of the Invention

The present invention relates to a seat belt system for restraining an occupant in a seat and, more specifically, to an improved four point seat belt apparatus.

2. Relevant Technology

Seat belt apparatuses are known to increase the safety of occupants in various motorized vehicles. Seat belt use is often cited as being the most useful line of defense in reducing accident injury. The recognition of seat belts has been reflected in safety programs advocating their use and state legislation mandating their use. Seat belts vary in their configuration but one of the most common seat belts is the lap belt apparatus. The lap belt includes right and left belts which traverse an occupant's lap and are secured to each other proximate to the occupant's mid abdomen. Securement of the lap belts is achieved through the use of a buckle which enables fastening to secure an occupant. Such lap belts may be found in almost all seats in automobiles and planes throughout the world.

Although conventional lap belt apparatuses are well used and accepted they do not limit movement of an occupant's head and torso. Thus, although the lower body is restrained, the upper body will experience rapid and dangerous movement during an accident. This is particularly dangerous for passengers in the front seat of an automobile who may strike the dashboard or windshield during an accident.

An improvement therefore is to introduce shoulder straps and harnesses to limit upper body movement. Single shoulder straps which traverse diagonally across an occupant's body are used in automobiles and aircraft throughout the world. To a lesser extent, double shoulder straps which traverse vertically across an occupant's upper body are also widely used in vehicles. Double shoulder straps provide additional contact with the upper torso to further limit upper body movement and provide additional safety. Seat belt apparatuses which incorporate double shoulder straps and lap belts are commonly referred to as four point seat belt systems.

A common concern with the four point seat belt system is that the buckle must preferably remain centered over the mid sagittal plane, i.e. on the middle of the occupant's abdomen. If the buckle does not remain in such a position, there will be an uneven load distribution on the different components of the seat belt apparatus. This may allow the occupant to twist in the seat and increases the risk of the occupant sliding between the shoulder belts. Loose contact with the shoulder belts may result in injury in the event of an accident.

Another concern is to prevent the buckle from sliding up on the occupant's abdomen during a collision and causing the lap belt loops to disengage from their contact with the iliac crests of the pelvic bone. This creates reduced retention of the pelvis, which can result in excessive loads on the abdomen and reduced seat belt restraint performance. Such conditions may lead to serious injury during the collision.

Thus, it would be an advancement in the art to provide a four point seat belt apparatus which retains the position of the buckle over the abdomen.

It would be a further advancement in the art to provide a four point seat belt apparatus which prevents upward movement of the buckle during a collision.

Such an apparatus is disclosed and claimed herein.

SUMMARY OF THE INVENTION

The present invention solves the foregoing problems by providing a four point seat belt apparatus with superior safety capability. The seat belt apparatus is used in combination with a seat and includes a seat belt webbing which traverses an occupant's body. The webbing includes first and second lap belts and first and second shoulder belts. The lap belts are secured at their one ends to a lap belt retractor which allows for extraction and retraction of the lap belts during normal use and locking of the lap belts during accident conditions.

In one embodiment, the lap belt retractor is secured to a forward and low position relative to the seat. The opposing ends of the lap belts are secured in a fixed manner to a lap belt anchor. The lap belt anchor is secured to a rearward and low position in the seat. The lap belt anchor may further incorporate a pretensioner to create a downward and rearward pull on the lap belts. The lap belts slidably engage a buckle assembly along a mid section of the lap belts. The lap belt retractor is configured to simultaneously retract the first and second lap belts to thereby retain the position of the buckle assembly over the mid abdomen section of an occupant.

The first and second shoulder belts are secured at one end to first and second shoulder belt retractors. The shoulder belt retractors are secured to the upper portion of the seat or to a fixed surface proximate to a location behind the occupant's head. The shoulder belt retractors allow for extraction and retraction of the shoulder belts under normal conditions, and fixed positioning of the shoulder belts during an accident. The opposing ends of the shoulder belts are secured in a fixed manner to the buckle assembly. The lap belt retractor and the lap belt anchor together pull the buckle assembly forward and downward to a lower position. The pretensioner creates a downward force pulling the buckle assembly rearward to better contact the iliac crests of the occupant's pelvis.

These features and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and features of the invention are obtained, a more particular description of the invention summarized above will be rendered by reference to the appended drawings. Understanding that these drawings only provide selected embodiments of the invention and are not therefore to be considered limiting of its scope, the invention will be described and explained with additional specificity and detail through the use of the accompanying drawings in which:

FIG. 1 is a forward view of one embodiment of the present invention as assembled in conjunction with a seat;

FIG. 2 is a side view of the embodiment of FIG. 1 as assembled in conjunction with a seat;

FIG. 3 is a plan view of a buckle assembly for use with the present invention;

DETAILED DESCRIPTION OF THE PREFERRED EMBODIMENTS

Figure 4A:
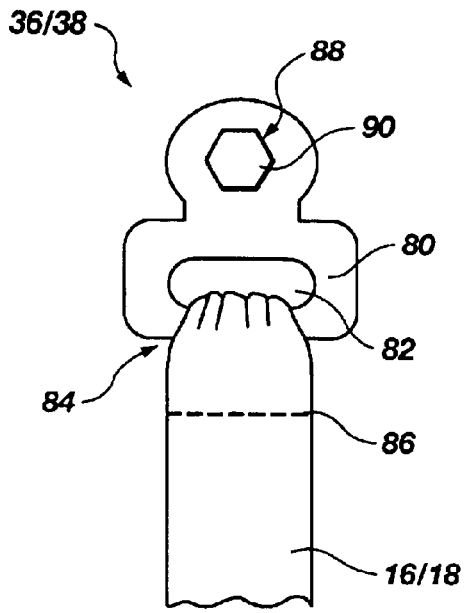
FIG. 4A is a plan view of one embodiment of a lap anchor suitable for use with the present invention.

A preferred embodiment of the invention is now described with reference to the FIGS. 1–7, where like reference numbers indicate identical or functionally similar elements. The components of the present invention, as generally described and illustrated in the Figures, may be implemented in a wide variety of configurations. Thus, the following more detailed description of the embodiments of the system and method of the present invention, as represented in the FIGS. 1–7, is not intended to limit the scope of the invention, as claimed, but is merely representative of presently preferred embodiments of the invention.

The invention provides a four point seat belt apparatus which better retains the position of the lap belts in a lower position and over the iliac crests during normal seat belt usage. Referring to FIGS. 1 and 2, there is shown forward and side views of the seat belt apparatus 10 as it is assembled for operation with a seat 12. The apparatus 10 includes a seat belt webbing 14 which is configured to retain an occupant in the seat 12. The seat belt webbing 14 includes first and second lap belts 16, 18 and first and second shoulder belts 20, 22. The first and second lap belts 16, 18 are configured to extend around an occupant's lap while the occupant is seated. The first and second shoulder belts 20, 22 are configured to extend from behind an occupant's head or neck and around the occupant's shoulders and torso.

The apparatus 10 further comprises a lap belt retractor 24 which is generally disposed below the seat 12. The lap belt retractor 24 may be secured to a lower portion 26 of the seat 12, such as underneath the seat 12. Alternatively, the lap belt retractor 24 may be secured to a rigid surface below the seat 12. In one embodiment, the lap belt retractor 24 is secured proximate a forward portion 28 of the seat 12. For purposes of describing the present invention, the forward direction is defined as the direction that an occupant is facing when seated normally in the seat 12. The rearward direction is defined as the direction opposing the forward direction.

Ends of the first and second lap belts 16, 18 are secured to the lap belt retractor 24. The lap belt retractor 24 provides extraction and retraction of the lap belts 16, 18 and may be embodied as any number of conventionally known retractors. In one embodiment, the lap belt retractor 24 provides a retention bias and allows the lap belts 16, 18 to unwind freely against that retention bias. In the event of any sudden or abnormal pull, the lap belt retractors 24 lock and prevent unwinding of the lap belts 16, 18. The retention bias eliminates slack in the lap belts 16, 18 and provides conformance of the belts 16, 18 to the occupant. The lap belt retractor 24 is further configured to apply simultaneous tension and winding of both the first and second lap belts 16, 18.

The first and second lap belts 16, 18 extend from the lap belt retractor 24 to a buckle assembly 30 where the lap belts 16, 18 slidably engage the buckle assembly 30. The buckle assembly 30 joins components of the seat belt webbing 14 to secure an occupant in the seat 12. The buckle assembly 30 is configured relative to the other components of the apparatus 12 such that it is centered over the mid sagittal plane, i.e. on the middle of the abdomen of an occupant. Slidable engagement of the lap belts 16, 18 with the buckle assembly 30 allows for conformance of the lap belts 16, 18 to the occupant.

The lap belts 16, 18 further extend from the buckle assembly 30 to a lap belt anchor 32. The lap belt anchor 32 is preferably disposed below the seat 12 and proximate to a rearward portion of the seat 12. In one embodiment, the lap belt anchor 32 is secured to the seat 12 but may also be secured to a rigid surface below the seat 12. The ends of the lap belts 16, 18 are secured to the lap belt anchor 32 in a relatively fixed relationship to prevent substantial movement of the lap belts 16, 18. In this manner, the lap belts 16, 18 have their ends secured to the lap belt retractor 24 and the lap belt anchor 32.

In one embodiment, the lap belt anchor 32 includes first and second anchors 36, 38 which are secured to first and second lap belts 16, 18 respectively. The first and second anchors 36, 38 may be disposed proximate opposing sides of the seat 12. Alternatively, the lap belt anchor 32 may include a single anchor which is disposed proximate the mid section of the seat 12 and is secured to the ends of the lap belts 16, 18.

The apparatus 10 further includes first and second shoulder belt retractors 40, 42 which are disposed approximate an upper portion 44 of the seat 12 such that the retractors 40, 42 are rearward of the user's head and neck. In various embodiments the shoulder belt retractors 40, 42 may be disposed on the upper portion 44 of the seat 12 or on a fixed surface rearward of the seat 12. Ends of the first and second shoulder belts 20, 22 are secured to the first and second shoulder belt retractors 40, 42 respectively. The first and second shoulder belt retractors 40, 42 provide release and retraction of the shoulder belts 20, 22 by unwinding and winding.

The shoulder belt retractors 40, 42 may be embodied as any number of conventionally known retractors. In one embodiment the shoulder belt retractors 40, 42 provide a retention bias and allow the shoulder belts 40, 42 to unwind freely against that retention bias. The shoulder belt retractors 40, 42 lock against any sudden or abnormal pull on the shoulder belts 20, 22. The retention bias eliminates slack in the shoulder belts 40, 42 and provides conformance of the belts 20, 22 to the occupant. The shoulder belts 20, 22 extend downward from the shoulder belt retractors 40, 42 and are secured in a fixed relationship to the buckle assembly 30.

The shoulder belt retractors 40, 42 may further be embodied as long spool retractors as is known in the art. In such an embodiment, the shoulder belt retractors 40, 42 are preferably disposed in an angular fashion such that the lower ends 46 are closer together than the upper ends 48 of the retractors 40, 42. Given the size requirements of the long spool retractors, such a disposition better accommodates occupants with broader shoulders.

Referring to FIG. 3, a plan view of the buckle assembly 30 is shown. The buckle assembly 30 comprises a latch plate 60 and a buckle bracket 62. The latch plate 60 and the buckle bracket 62 serve to secure the configuration of the lap and shoulder belts 16, 18, 20, 22. The latch plate 60 includes a shoulder belt interface 64 for securing the latch plate 60 to the first shoulder belt 20. The shoulder belt interface 64 may be disposed on an upper portion of the latch plate 60. In one embodiment, the shoulder belt interface 64 is embodied as a slot 64. An end 66 of the first shoulder belt 20 is inserted into the slot 64 to form a loop and then is secured to the first shoulder belt 20. The end 66 may be secured by stitching 68 as shown in FIG. 3 but may also be secured in various ways such as by use of fasteners or adhesives. Similarly, the buckle bracket 62 has a shoulder belt interface 64, such as a slot 64, for securing the buckle bracket 62 to a second shoulder belt 22. An end 70 of the second shoulder belt 22 is inserted into the slot 64 to form a loop and then is secured to the second shoulder belt 22 such as by stitching 68. In this manner, the shoulder belts 20, 22 are secured to the buckle assembly 30.

The latch plate 60 and the buckle plate 62 further include a sliding lap belt interface 72. The sliding belt interface 72 may be embodied as a slot 72 which may be configured in a vertical orientation. The sliding belt interface 72 serves to engage the latch plate 60 and buckle plate 62 with the first and second lap belts 16, 18 respectively. In one embodiment, the first and second lap belts 16, 18 slidably engage the latch plate 60 and buckle plate 62 to thereby ensure conformance of the lap belts 16, 18 to the occupant. As such, the first and second lap belts 16, 18 are introduced into their respective slots 72 and extend out of the slots 72.

The buckle assembly 30 further includes a latch 74 secured to the latch plate 60 and a buckle 76 secured to a buckle bracket 62. The latch 74 interfaces with the buckle 76 to securely engage the latch 74 and buckle 76 together and thereby fasten the buckle assembly 30. Fastening the buckle assembly 30 secures the position of the buckle assembly 30, the lap belts 16, 18, and the shoulder belts 20, 22 relative to the occupant.

In operation the lap belt retractor 24 simultaneously extracts and retracts both lap belts 16, 18. This causes the lap belts 16, 18 to have substantially the same displacement which results in centering of the buckle assembly 30 over the mid abdomen of the occupant. The location of the lap belt retractor 24 forward of the lap belt anchor 32 pulls the buckle assembly 30 forward and downward to the desired position.

Referring to FIG. 4A, an embodiment for the first and second anchors 36, 38, which may be identical, is shown. The anchor 36, 38 may be permanently attached to the lower and rearward portion 26, 34 of the seat 12, as previously stated, or attached to a rigid surface proximate the lower and rearward portion 26, 34 of the seat 12. The anchor 36, 38 may include an anchor plate 80. The anchor plate 80 has an interface 82 which may be embodied as a slot 82. An end 84 of the lap belt 16, 18 is inserted into the slot 82, forms a loop, and is then secured to the lap belt 16, 18. Securement of the end 84 may be achieved by stitching 86, as shown in FIG. 4, or by fasteners or adhesives. In this manner, the lap belt 16, 18 is secured to the anchor plate 80.

The anchor plate 80 is in turn secured to the seat 12 or a rigid surface. In one embodiment, this is achieved by configuring the anchor plate 80 with an aperture 88. A bolt 90 may be inserted into the aperture 88 and screwed into the mounting surface. One of skill in the art will appreciate that the anchor 36, 38 may be embodied in various ways and only one such embodiment has been shown for illustrative purposes.

Figure 4B:
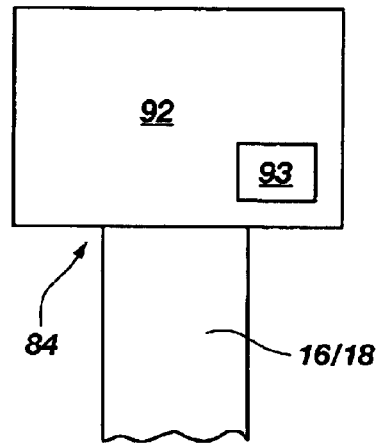
FIG. 4B is a block diagram of an alternative embodiment of a lap anchor suitable for use with the present invention.

Referring to FIG. 4B an alternative embodiment for the lap anchor 36, 38 is shown wherein the lap anchor 36, 38 includes a pretensioner 92. The pretensioner 92 is a conventional device which is configured to pull on a belt and reduce the slack in the belt. Typically, pretensioners 92 include a sensor 93, similar to those in air bag systems, which responds to accident conditions within the first milliseconds of an accident. The sensor 93 signals the pretensioner 92 to pull the lap belt 16, 18 rearward and downward. In one embodiment the pretensioners 92 for the first and second lap anchors 36, 38 would provide a simultaneous and substantially equivalent pull. This creates equal tension in the lap anchors 36, 38 and assists in the centering of the buckle assembly 30.

During accident conditions, the pretensioner 92 pulls on the end 84 of the lap belt 16, 18 to create tension. The tensioning of the lap belt anchor 32 creates a downward force which pulls the buckle assembly 30 rearward to better engage the iliac crests of the pelvis with the lap belts 16, 18. The slidable engagement of the lap belts 16, 18 with the latch plate 60 and the buckle bracket 62 creates a pulley action which increases the tensioning distance and increases the tensioning pull.

In an alternative embodiment, the lap anchor 32 may comprise a single pretensioner 92. Both lap belts 16, 18 would be fed into the pretensioner 92 which provides simultaneous and substantially equivalent pull during an accident. Obviously, the use of a single pretensioner 92 for both lap belts 16, 18 requires a stronger pretensioner 92.

Figure 5:
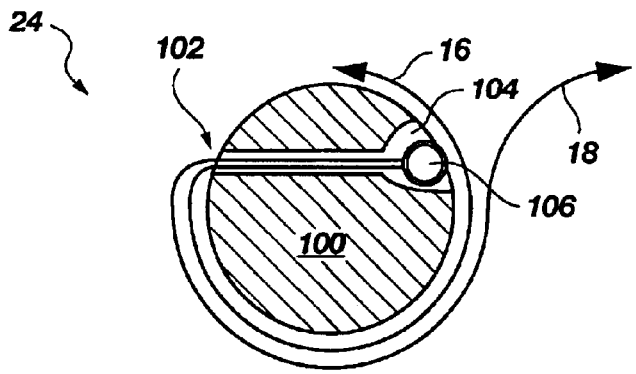
FIG. 5 is a cross sectional view of one embodiment of a lap retractor for use with the present invention.

Referring to FIG. 5, a cross sectional view of one embodiment of a lap belt retractor 24 is shown. The retractor 24 comprises a retractor spindle 100 which may be embodied in a cylindrical shape and is biased to turn and retract the lap belts 16, 18. The biasing may be achieved through the use of springs as is well known in the art. The retractor spindle 100 allows extraction of the lap belts 16, 18 upon pressure being applied to the lap belts 16, 18. Upon abnormal pressure, such as those experienced during an automobile accident, the retractor spindle 100 locks its position.

The retractor spindle 100 is configured with a channel 102 through which the first and second lap belts 16, 18 are introduced. The lap belts 16, 18 extend through the channel 102 to a recess 104. In the recess 104, the lap belts 16, 18 loop around a pin 106 which is secured to the spindle 100. The lap belts 16, 18 may be secured to themselves through stitching, adhesives, or fasteners to thereby secure the loop around the pin 106. The lap belts 16, 18 overlie one another as they extend through the channel 102 and as they traverse the exterior diameter of the spindle 100. At a certain point, the lap belts 16, 18 separate from their contact with one another and extend around the seat 12 to the buckle assembly 30.

As the spindle 100 retracts the lap belts 16, 18, the lap belts 16, 18 wrap around the spindle 100 and a greater portion of the belts 16, 18 overlie one another. As the spindle 100 extracts the lap belts 16, 18, the lap belts 16, 18 unwrap from the spindle and separate from one another. In this manner, a single spindle 100 may be used to accommodate two lap belts 16, 18 and create pull to simultaneously retract the belts 16, 18.

Figure 6:
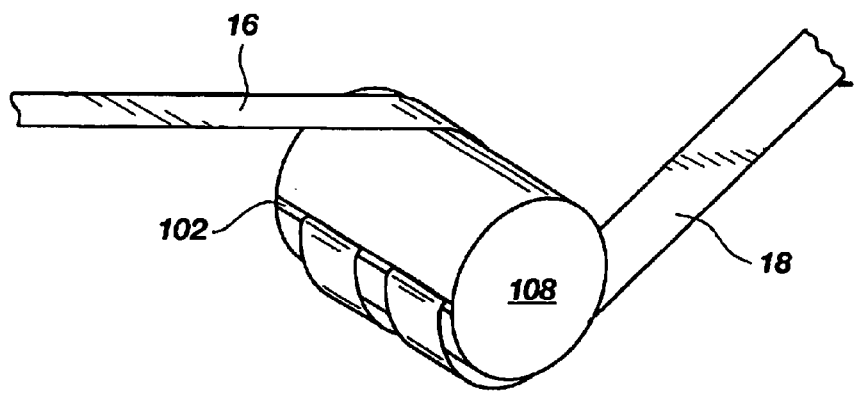
FIG. 6 is a perspective view of an alternative embodiment of a lap retractor for use with the present invention.

Referring to FIG. 6, an alternative embodiment for the lap belt retractor 24 is shown. As in the embodiment of FIG. 5, the retractor 24 comprises a retractor spindle 108 which is embodied in a cylindrical shape. The spindle 108 is biased to turn to retract the lap belts 16, 18 and allows extraction of the lap belts 16, 18 upon applied pressure. The spindle 108 further has a longitudinal length suitable for side-by-side or parallel disposition of the lap belts 16, 18 along the exterior surface of the spindle 108 as shown. Thus, in such an embodiment, the lap belts 16, 18 do not overlie one another. The lap belts 16, 18 wind and unwind along the spindle 108 as the spindle 108 turns to allow for retraction and extraction. As shown in FIG. 6, the lap belts 16, 18 are secured within a channel 102 to the spindle 108. Securement of the lap belts 16, 18 to the spindle 108 may be achieved as in the embodiment of FIG. 5 by use of a webbing pin 106. Of course, one of skill in the art will appreciate that there are numerous ways to secure the lap belts 16, 18 to the spindle 108, all of which are included within the scope of the invention. As the lap belts 16, 18 exit from the channel 102 they wrap around the diameter of the spindle 108. At a certain point the lap belts 16, 18 depart from the spindle 108 and extend in opposing directions.

Figure 7:
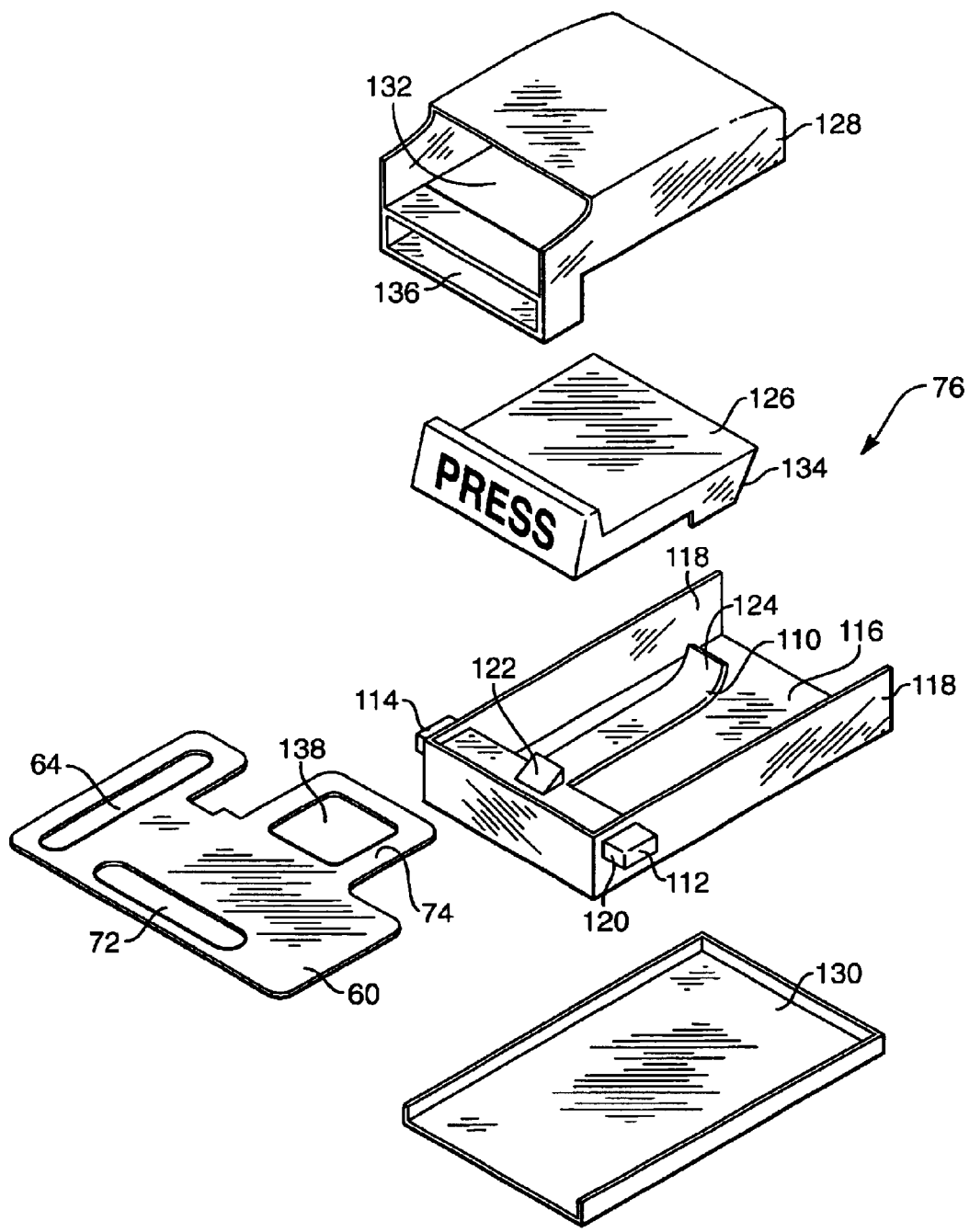
FIG. 7 is a partially exploded perspective view of a buckle for use with the present invention.

Referring to FIG. 7, a partially exploded view of a buckle 76 which may be used with the present invention is shown. The buckle 76 includes an engaging member 110 having first and second arms 112, 114. The buckle 76 further includes a support plate 116 upon which the engaging member 110 is disposed. The support plate 116 includes two side plates 118 which are each configured with an aperture 120. The first and second arms 112, 114 extend from the engaging member 110 and nest within a respective aperture 120. The engaging member 110 has a lock end 122 which is biased to extend upwards. Biasing of the lock end 122 may be achieved by disposing a spring (not shown) between the lock end 122 and the support plate 116. The engaging member 110 extends and slopes upward from the lock end 122 to a rising end 124. The rising end 124 is configured to engage with a releasing member 126.

The buckle 76 further includes upper and lower housings 128, 130 for housing the respective components of the buckle 76. The releasing member 126 is slidably introduced into a guiding aperture 132 in the upper housing 128. The releasing member 126 may be biased to at least partially extend from the guiding aperture 132. The releasing member 126 is configured with a sloped portion 134 which faces and engages the rising end 124 of the engaging member 110. When the releasing member 126 is pushed further into the upper housing 128, the releasing member 126 forces the rising end 124 downward. In operation, the latch 74 is inserted into an insertion aperture 136 in the upper housing 128. As the latch 74 is introduced, the latch 74 forces the lock end 122 downward. The latch 74 is configured with a latch aperture 138 which engages and receives the lock end 122. As the latch aperture 138 slides over the lock end 122, the lock end 122 extends upward and into the latch aperture 138. To release the latch 74 from the buckle 76, the releasing member 126 is pushed inward and the sloped portion 134 of the releasing member 126 forces the rising end 124 down. This causes the lock end 122 to slightly turn downward and disengage from the latch aperture 138. One of skill in the art will appreciate that various buckles may be used with the present invention and the above described buckle 76 is but one embodiment and shown herein for illustrative purposes only.

The present invention provides a seat belt apparatus 10 with improved safety performance. The seat belt apparatus 10 ensures that the buckle assembly 30 is centered over the mid abdomen to prevent sliding of the buckle assembly 30 during a collision. This is achieved by synchronizing the lengths of the lap belts 16, 18 by use of the lap belt retractor 24 and the slidable engagement of the lap belts 16, 18 with the buckle assembly 30. The lap belt retractor 24 disposed forward of the lap belt anchor 32 pulls the buckle assembly 30 forward and downward to a lower position. The use of one or more pretensioners 92 creates a downward force pulling the buckle assembly rearward to better contact the iliac crests of the occupant's pelvis. The overall configuration of the seat belt apparatus provides better contact with an occupant and reduces the likelihood of injury.

The present invention may be embodied in other specific forms without departing from its scope or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A seat belt apparatus, comprising:
   first and second shoulder belt retractors;
   first and second lap belt anchors;
   a lap belt retractor;
   a buckle assembly; and
   a seat belt webbing having,
      first and second lap belts secured to the first and second lap belt anchors respectively and engaging the buckle assembly and secured to the lap belt retractor, and
      first and second shoulder belts secured to the first and second shoulder belt retractors respectively and secured to the buckle assembly, wherein the lap belt retractor is disposed substantially forward of the first and second lap belt anchors and pulls the buckle assembly in a generally forward and downward direction.

2. The seat belt apparatus of claim 1 wherein the first and second lap belts slidably engage the buckle assembly.

3. The seat belt apparatus of claim 1 wherein the lap belt retractor is configured to simultaneously retract the first and second lap belts.

4. The seat belt apparatus of claim 1 wherein the first and second shoulder belt retractors are disposed on the upper portions of a seat.

5. The seat belt apparatus of claim 1 wherein the lap belt retractor is disposed on the lower portion of a seat.

6. The seat belt apparatus of claim 1 wherein the first and second lap belt anchors are disposed on the lower portion of a seat.

7. The seat belt apparatus of claim 1 wherein the lap belt retractor comprises a retractor spindle configured to secure the first and second lap belts such that the first and second lap belts overlie one another.

8. The seat belt apparatus of claim 1 wherein the lap belt retractor comprises a retractor spindle configured to secure the first and second lap belts parallel to one another.

9. The seat belt apparatus of claim 1 wherein the buckle assembly comprises,
   a latch plate for slidably engaging the first lap belt and secured to the first shoulder belt; and
   a buckle bracket for slidably engaging the second lap belt and secured to the second shoulder belt.

10. The seat belt apparatus of claim 1 wherein the first and second lap belt anchors comprise first and second pretensioners respectively.

11. A seat belt apparatus, comprising:
    first and second shoulder belt retractors;
    a lap belt anchor;
    a lap belt retractor;
    a buckle assembly; and
    a seat belt webbing having,
       first and second lap belts configured to pass around the lap and abdomen of a passenger and secured to the lap belt anchor and slidably engaging the buckle assembly and secured to the lap belt retractor, and
       first and second shoulder belts configured to pass over the shoulders and torso of a passenger and secured to the first and second shoulder belt retractors respectively and secured to the buckle assembly, wherein the lap belt retractor is disposed substantially forward of the lap belt anchor and pulls the buckle assembly in a generally forward and downward direction.

12. The seat belt apparatus of claim 11 wherein the lap belt anchor comprises first and second lap belt anchors secured to first and second lap belts respectively.

13. The seat belt apparatus of claim 12 wherein the first and second lap belt anchors comprise first and second pretensioners respectively.

14. The seat belt apparatus of claim 11 wherein the lap belt anchor comprises a pretensioner configured to provide substantially equal tension in the first and second lap belts.

15. The seat belt apparatus of claim 11 wherein the lap belt retractor is configured to simultaneously retract the first and second lap belts.

16. The seat belt apparatus of claim 11 wherein the first and second shoulder belt retractors are disposed on the upper portions of a seat.

17. The seat belt apparatus of claim 11 wherein the lap belt retractor is disposed on the lower portion of a seat.

18. The seat belt apparatus of claim 11 wherein the lap belt anchor is disposed on the lower portion of a seat.

19. The seat belt apparatus of claim 11 wherein the lap belt retractor comprises a retractor spindle configured to secure the first and second lap belts such that the first and second lap belts overlie one another.

20. The seat belt apparatus of claim 11 wherein the lap belt retractor comprises a retractor spindle configured to secure the first and second lap belts parallel to one another.

21. The seat belt apparatus of claim 11 wherein the buckle assembly comprises,
   a latch plate for slidably engaging the first lap belt and secured to the first shoulder belt; and
   a buckle bracket for slidably engaging the second lap belt and secured to the second shoulder belt.

* * * * *